US012046851B2

(12) United States Patent
Zheng et al.

(10) Patent No.: US 12,046,851 B2
(45) Date of Patent: Jul. 23, 2024

(54) ASSEMBLED ELECTRICAL COAXIAL CONNECTOR

(71) Applicant: T-CONN PRECISION (ZHONGSHAN) CO., LTD., Zhongshan (CN)

(72) Inventors: Jia-Heng Zheng, Zhongshan (CN); Wu-Lin Liu, Zhongshan (CN)

(73) Assignee: T-Conn Precision (Zhongshan) Co., Ltd., Guangdong (CN)

( * ) Notice: Subject to any disclaimer, the term of this patent is extended or adjusted under 35 U.S.C. 154(b) by 221 days.

(21) Appl. No.: 17/506,995

(22) Filed: Oct. 21, 2021

(65) Prior Publication Data

US 2023/0076996 A1 Mar. 9, 2023

(30) Foreign Application Priority Data

Sep. 7, 2021 (CN) ......................... 202111041215.4

(51) Int. Cl.

*H01R 13/504* (2006.01)
*H01R 13/52* (2006.01)
*H01R 13/629* (2006.01)
*H01R 24/54* (2011.01)

(52) U.S. Cl.

CPC ..... *H01R 13/5045* (2013.01); *H01R 13/5202* (2013.01); *H01R 13/629* (2013.01); *H01R 24/542* (2013.01)

(58) Field of Classification Search

CPC ............ H01R 13/5045; H01R 13/5202; H01R 13/629; H01R 24/542
See application file for complete search history.

(56) References Cited

U.S. PATENT DOCUMENTS

| | | | | | |
|---|---|---|---|---|---|
| 4,645,288 | A * | 2/1987 | Stursa | H01R 24/50 | 439/876 |
| 4,795,352 | A * | 1/1989 | Capp | H01R 24/50 | 439/63 |
| 4,964,805 | A * | 10/1990 | Gabany | H01R 24/50 | 439/434 |
| 5,857,867 | A * | 1/1999 | Henry | H01R 13/28 | 439/675 |
| 5,971,811 | A * | 10/1999 | Mori | H01R 4/489 | 439/675 |

(Continued)

FOREIGN PATENT DOCUMENTS

| | | |
|---|---|---|
| CN | 201332159 Y | 10/2009 |
| TW | M412513 U | 9/2011 |

*Primary Examiner* — Thanh Tam T Le
(74) *Attorney, Agent, or Firm* — Rosenberg, Klein & Lee

(57) ABSTRACT

An assembled electrical connector has a base having a terminal stage formed on a top thereof, an upper cap, a first conductive terminal mounted in a center of the terminal stage, and a second conductive terminal externally assembled on the base. The second conductive terminal is a ring sheet, surrounds the terminal stage, and is electrically isolated from the first conductive terminal via the terminal stage. The upper cap is tubular and is connected on the top of the base. The second conductive terminal abuts against an internal surface of the upper cap. Because the second conductive terminal is externally assembled on the terminal stage of the base and is not combined with the base via insert molding, the second conductive terminal does not need to use a machining product.

11 Claims, 13 Drawing Sheets

(56) References Cited

U.S. PATENT DOCUMENTS

| | | | | | |
|---|---|---|---|---|---|
| 6,099,334 | A * | 8/2000 | Togashi | ............... | H01R 13/703<br>200/51.1 |
| 6,280,214 | B1 * | 8/2001 | Chang | .................... | H01R 29/00<br>200/51.1 |
| 6,296,492 | B1 * | 10/2001 | Fujimoto | ........... | H01R 13/6315<br>439/63 |
| 7,311,566 | B2 * | 12/2007 | Dent | ...................... | H01R 13/53<br>439/63 |
| 7,484,965 | B2 * | 2/2009 | Chien | .................... | H01R 24/50<br>439/63 |
| 9,379,498 | B2 * | 6/2016 | Kaneko | .................. | H01R 24/44 |
| 9,692,151 | B2 * | 6/2017 | Kunieda | ................ | H01R 24/46 |
| 10,096,954 | B2 * | 10/2018 | Demura | ............... | H01R 12/727 |
| 10,103,485 | B2 * | 10/2018 | Ikeda | ................... | H01R 13/631 |
| 10,164,384 | B2 * | 12/2018 | Maruyama | ............. | H01R 24/50 |
| 10,236,626 | B2 * | 3/2019 | Panitz | .................. | H01R 13/502 |
| 10,424,866 | B1 * | 9/2019 | Peng | ...................... | H01R 24/50 |
| 10,559,921 | B2 * | 2/2020 | Sakaue | .................. | H01R 13/20 |
| 11,070,013 | B2 * | 7/2021 | Brandt | ................. | H01R 24/542 |

* cited by examiner

ASSEMBLED ELECTRICAL COAXIAL CONNECTOR

1. FIELD OF THE INVENTION

The present invention relates to an electrical connector, and more particularly to an assembled electrical connector.

2. DESCRIPTION OF THE PRIOR ART

Batteries are used to supply power to electrical cars and/or electrical motorcycles for operation. With reference to FIGS. 9 and 10, an electrical connector in a connection interface for connecting the vehicle and the battery has a base 70, a negative terminal 71, a positive terminal 72, a negative conductive sheet 73, and a positive conductive sheet 74.

The negative terminal 71 and the positive terminal 72 are coaxially disposed in the base 70. An isolation holder 75 is formed in the base 70 and is located between the negative terminal 71 and the positive terminal 72 to electrically isolate the negative terminal 71 and the positive terminal 72 from each other. The negative terminal 71 is hollow and tubular. A first crown spring 76 is mounted in and conductively connected to the negative terminal 71. The positive terminal 72 is tubular. A second crown spring 77 is mounted in and conductively connected to the positive terminal 72. When a plug having specification corresponding to the above mentioned electrical connector is plugged in the electrical connector, the plug contacts the first crown spring 76 and the second crown spring 77 respectively for conductive contacts, thereby getting electrically connected with the negative terminal 71 and the positive terminal 72 respectively.

Moreover, the base 70 is a molding product. To manufacture the electrical connector, the negative terminal 71 and the positive terminal 72 are placed in a mold for molding the base 70. After the base 70 is molded, the negative terminal 71 and the positive terminal 72 are fixed in the base 70 and is electrically isolated from each other via the isolation holder 75 formed in the base 70. Because the negative terminal 71 and the positive terminal 72 are placed in the mold during molding process for molding the base 70, in consideration of mold design and structural strength, the negative terminal 71 and the positive terminal 72 have to be machining products. However, the machining products need longer manufacturing time and larger material usage, and make more scraps, thereby increasing manufacturing costs. Especially the negative terminal 71 has a lager diameter, and the material usage for the negative terminal 71 is much larger than that for the positive terminal 72. Accordingly, as machining products, the negative terminal 71 is more expensive than the positive terminal 72.

With reference to FIGS. 10 and 11, a cavity 78 is formed in the base 70 and is located below the isolation holder 75. To match the installing arrangement of the negative conductive sheet 73 and the positive conductive sheet 74 at an angle, the cavity 78 is limited within a particular range of a bottom of the base 70. Therefore, if the cavity 78 is smaller, the other space in the bottom of the base 70 is larger, whereby possibility of saving materials without affecting structural strength during molding is higher. However, limited by structures and installations of the negative conductive sheet 73 and the positive conductive sheet 74, the possibility of saving materials during molding is reduced.

With reference to FIGS. 11 and 12, each of the negative conductive sheet 73 and the positive conductive sheet 74 has a vertical segment, an upper horizontal segment 731, 741 formed on a top of the vertical segment, and a lower horizontal segment 732, 742 formed on a bottom of the vertical segment. The upper horizontal segment 731, 741 and the lower horizontal segment 732, 742 extend toward opposite directions respectively. The upper horizontal segments 731, 741 of the negative conductive sheet 73 and the positive conductive sheet 74 are respectively connected to the negative terminal 71 and the positive terminal 72 via respective bolts 733, 743 threaded into the bottoms of the negative terminal 71 and the positive terminal 72 with electrical connections.

With reference to FIG. 13, after the negative conductive sheet 73 and the positive conductive sheet 74 are assembled, the bottom of the base 70 is filled with sealing glue 79. The sealing glue 79 is filled in the cavity 78, encapsulates the upper horizontal segments 731, 741 of the negative conductive sheet 73 and the positive conductive sheet 74, and is further filled in an outer area surrounding the cavity 78. Only the lower horizontal segments 732, 742 of the negative conductive sheet 73 and the positive conductive sheet 74 are uncovered from the sealing glue 79 for external electrical connections.

As above mentioned, because of structures and installations of the negative conductive sheet 73 and the positive conductive sheet 74, the possibility of saving materials during molding is reduced. The major reason is that the negative conductive sheet 73 and the positive conductive sheet 74 are respectively connected to the bottoms of the negative terminal 71 and the positive terminal 72 via their own upper horizontal segments 731, 741, thereby directly affecting a space volume in the cavity 78. More particularly, considering electrical property, if the upper horizontal segments 731, 741 of the negative conductive sheet 73 and the positive conductive sheet 74 cannot be omitted or reduced in size, the possibility of saving materials during molding is lower.

In addition, the negative conductive sheet 73 and the positive conductive sheet 74 are uncovered by the sealing glue 79 with a part of the vertical segment and the lower horizontal segments 732, 742 thereof, because the negative conductive sheet 73 and the positive conductive sheet 74 are arranged at an angle, a shorter distance between uncovered portions thereof does not meet the safety requirement that requires the creepage distance must be larger than 17.6 millimeters.

To overcome the shortcomings, the present invention provides an assembled electrical connector to mitigate or obviate the aforementioned problems.

SUMMARY OF THE INVENTION

The main objective of the present invention is to provide an assembled electrical connector that has some of the main components assembled externally, thereby reducing the use of expensive machining products, saving materials, enhancing manufacturing convenience, and reducing costs.

An assembled electrical connector comprises a base having a terminal stage formed on a top of the base, a first conductive terminal mounted in a center of the terminal stage, a second conductive terminal, and an upper cap. The first conductive terminal has an upper segment extending out of the terminal stage and a lower segment in the terminal stage. The second conductive terminal is a ring sheet, is externally assembled around the terminal stage, and is coaxially arranged with and electrically isolated from the first conductive terminal via the terminal stage. The upper cap is tubular and is mounted on the top of the base. The upper segment of the first conductive terminal is located in a center of the upper cap. The second conductive terminal abuts against an internal surface of the upper cap.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
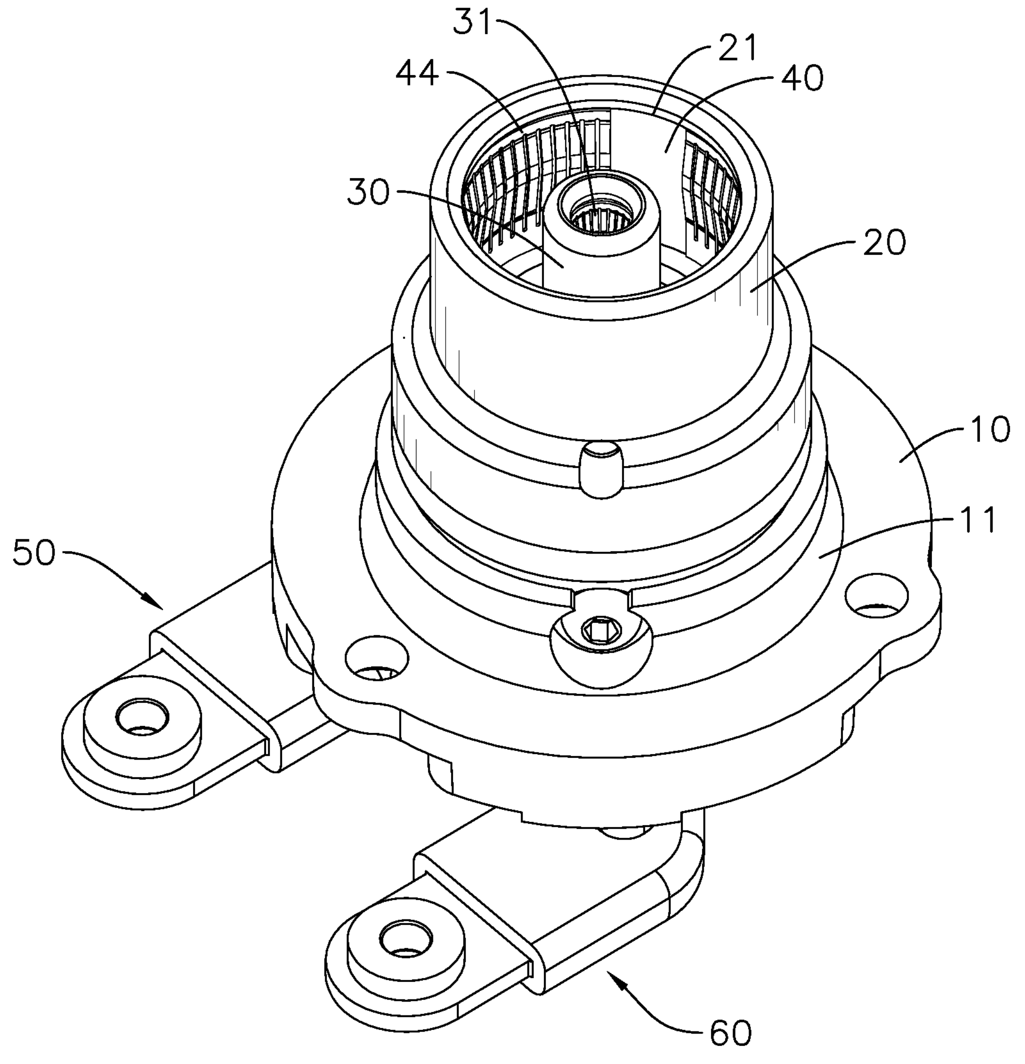
FIG. 1 is a perspective view of an assembled electrical connector in accordance with the present invention.
Figure 2:
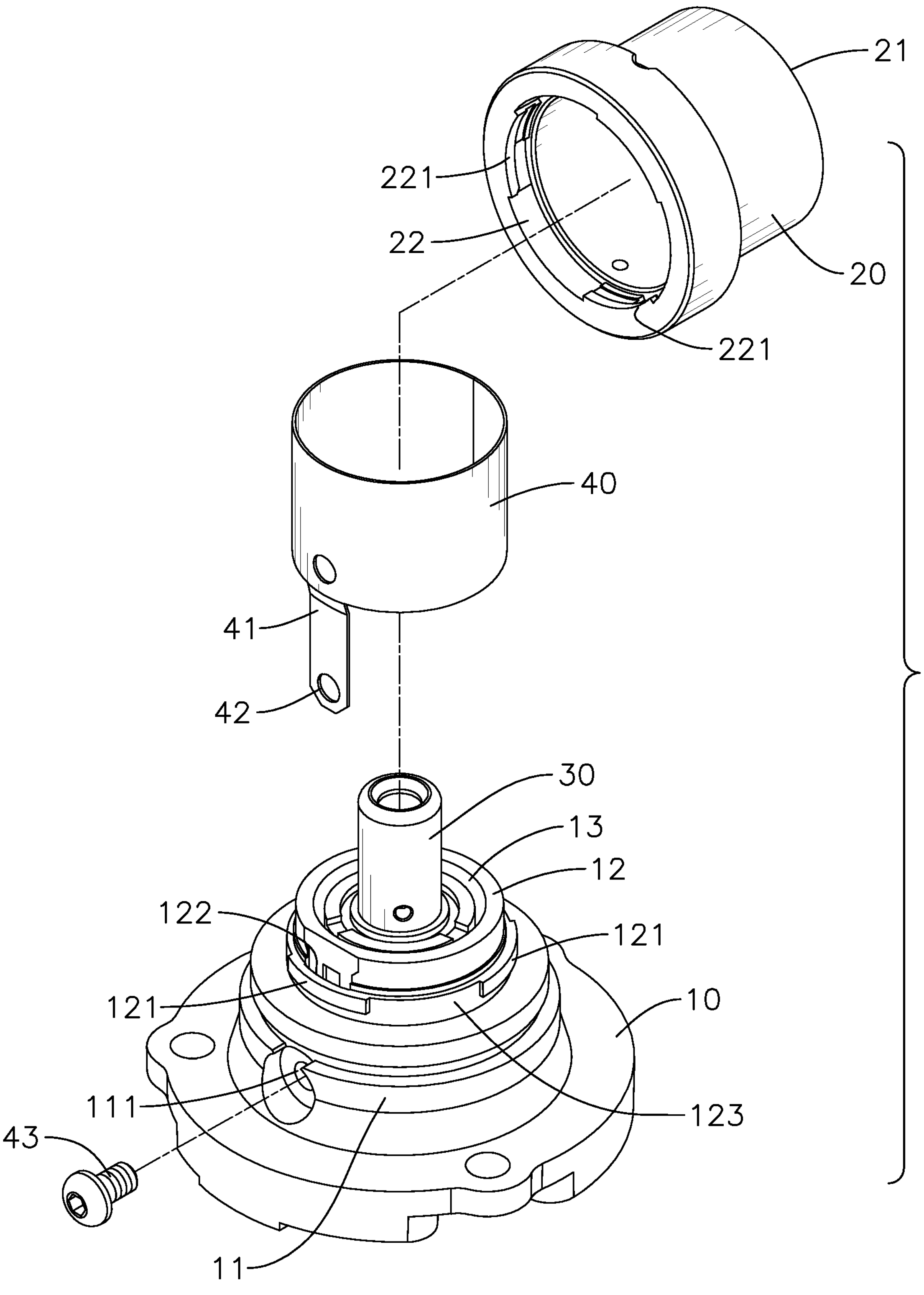
FIG. 2 is an exploded perspective view of the assembled electrical connector in FIG. 1, showing that a base, a second conductive terminal, and an upper cap are exploded, wherein some components are omitted.

With reference to FIGS. 1 and 2, an assembled electrical connector in accordance with the present invention comprises a base 10, an upper cap 20 assembled on the base 10, a first conductive terminal 30 mounted in the base 10, and a second conductive terminal 40 externally assembled on the base 10. The second conductive terminal 40 is located in and abuts against an internal surface of the upper cap 20 and coaxially surrounds the first conductive terminal 30. A first conductive sheet 50 and a second conductive sheet 60 are mounted in a bottom of the base 10 and are respectively electrically connected to the first conductive terminal 30 and the second conductive terminal 40. The first conductive terminal 30 could be a negative or a positive conductive terminal. The first conductive sheet 50 could be a negative or a positive conductive sheet. The second conductive terminal 40 could be a positive or a negative conductive terminal corresponding to the first conductive terminal 30. The second conductive sheet 60 could be a positive or a negative conductive sheet corresponding to the first conductive sheet 50. In the embodiment, the first conductive terminal 30 is a positive conductive terminal, the second conductive terminal 40 is a negative conductive terminal, the first conductive sheet 50 is a positive conductive sheet correspondingly, and the second conductive sheet 60 is a negative conductive sheet correspondingly, but not limited thereto.

With reference to FIG. 2, the base 10 has a round base body and a round step 11 protruding upwardly from a middle of the base body. An external diameter of the step 11 is smaller than an external diameter of the base body. A terminal stage 12 protrudes upwardly from a top of the step 11. An external diameter of the terminal stage 12 is smaller than the external diameter of the step 11. The base 10 is roughly formed as a round tower.

The first conductive terminal 30 is disposed in a center of the terminal stage 12. During manufacturing, the first conductive terminal 30 is placed in a mold for molding the base 10. After the molding of the base 10 is completed, the first conductive terminal 30 is disposed in the center of the terminal stage 12 and has an upper segment extending out of the terminal stage 12 and a lower segment mounted in the terminal stage 12. The terminal stage 12 is substantially cylindrical. At least two protruding ribs 121 are radially formed on and around the terminal stage 12 and are adapted to connect with the upper cap 20. In the embodiment, three said protruding ribs 121 are disposed around the terminal stage 12 at equiangular intervals. A gap 123 is formed between each two of the protruding ribs 121 adjacent to each other.

A through passage 122 is formed in the terminal stage 12 and is vertically formed through the bottom of the base 10. So the through passage 122 is also formed through the step 11 of the base 10. A positioning hole 111 is radially formed in the step 11 and communicates with the through passage 122. The through passage 122 is adapted to fix the second conductive terminal 40. The second conductive terminal 40 is a ring sheet and is made by stamping, cutting, and bending of a conductive metal sheet. The second conductive terminal 40 is assembled around the terminal stage 12 and has an internal diameter matching the external diameter of the terminal stage 12 in size to sleeve on and surround the terminal stage 12. Thus, the second conductive terminal 40 is coaxially aligned with the first conductive terminal 30 in the center of the terminal stage 12 and is electrically isolated from the first conductive terminal 30 via the terminal stage 12.

The second conductive terminal 40 has a conductive portion 41 being an elongated piece and extending downwardly from a bottom thereof. A connecting hole 42 is formed in the conductive portion 41 near a bottom thereof. The conductive portion 41 corresponds to the through passage 122 in the terminal stage 12 in position. When the conductive portion 41 is inserted into the through passage 122, the connecting hole 42 near the bottom of the conductive portion 41 is aligned with the positioning hole 111 radially formed in the step 11. A bolt 43 is inserted through the positioning hole 111 and the connecting hole 42 aligned with each other and is electrically connected to the second conductive sheet 60, which will be described in detail later.

The upper cap 20 is tubular and has a circular insertion opening 21 and a circular assembly opening 22 respectively formed in two ends of the upper cap 20. The assembly opening 22 has an internal diameter corresponding to the external diameter of the terminal stage 12 in size. At least two engaging blocks 221 are radially formed on and arranged around an inner edge of the assembly opening 22 and correspond to the at least two protruding ribs 121 radially formed on the terminal stage 12 in quantity and location In the embodiment, three said engaging blocks 221 are formed on the edge of the assembly opening 22 and are arranged at equiangular intervals to correspond to the three said protruding ribs 121 on the terminal stage 12 in position. A length of each of the engaging blocks 221 is smaller than a width of the gap 123 formed between each two of the protruding ribs 121 adjacent to each other.

Figure 3:
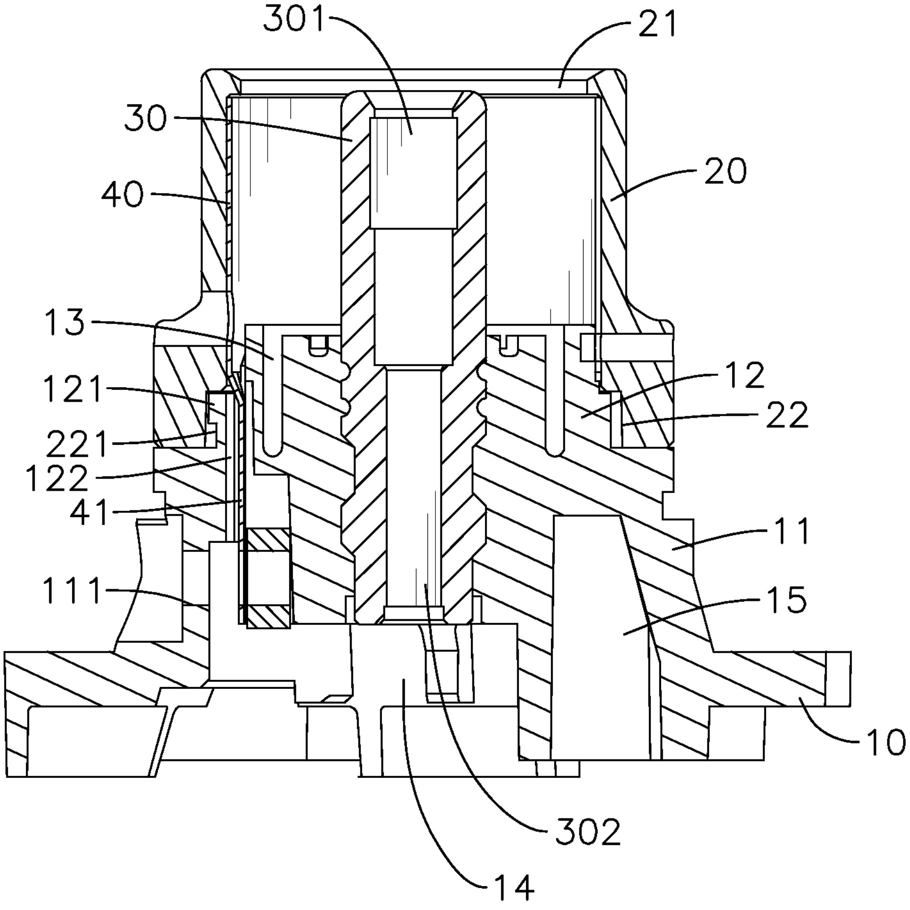
FIG. 3 is a cross sectional side view of the assembled electrical connector in FIG. 2.

To assemble the upper cap 20 with the terminal stage 12 of the base 10, the engaging blocks 221 formed on the assembly opening 22 are respectively aligned with the gaps 123 formed between the protruding ribs 121, and the upper cap 20 is moved down to cover the terminal stage 12. After the upper cap 20 covers the terminal stage 12, the engaging blocks 221 on the assembly opening 22 of the upper cap 20 are misaligned with the protruding ribs 121 on the terminal stage 12 and are located in position lower than the protruding ribs 121. Then, the upper cap 20 is rotated to move the engaging blocks 221 directly below the protruding ribs 121 to be limited by the protruding ribs 121. So the upper cap 20 is assembled around the terminal stage 12 of the base 10 as shown in FIG. 3. The upper segment of the first conductive terminal 30 is located in a center of the upper cap 20.

With reference to FIG. 2, each of the engaging blocks 221 formed on the assembly opening 22 of the upper cap 20 is L-shaped. Each of the engaging blocks 221 has a stopping portion formed on an end thereof to limit a rotation angle of the upper cap 20.

With reference to FIGS. 2 and 3, at least one annular groove 13 is coaxially formed in a top surface of the terminal stage 12. A depth of each of the at least one annular groove 13 is larger than half of a radius of the terminal stage 12. So an insulation surface of the terminal stage 12 is increased to ensure that there is enough creepage distance between the first conductive terminal 30 in the center of the terminal stage 12 and the second conductive terminal 40 surrounding the terminal stage 12, and an area for heat dissipation is also increased.

Figure 4:
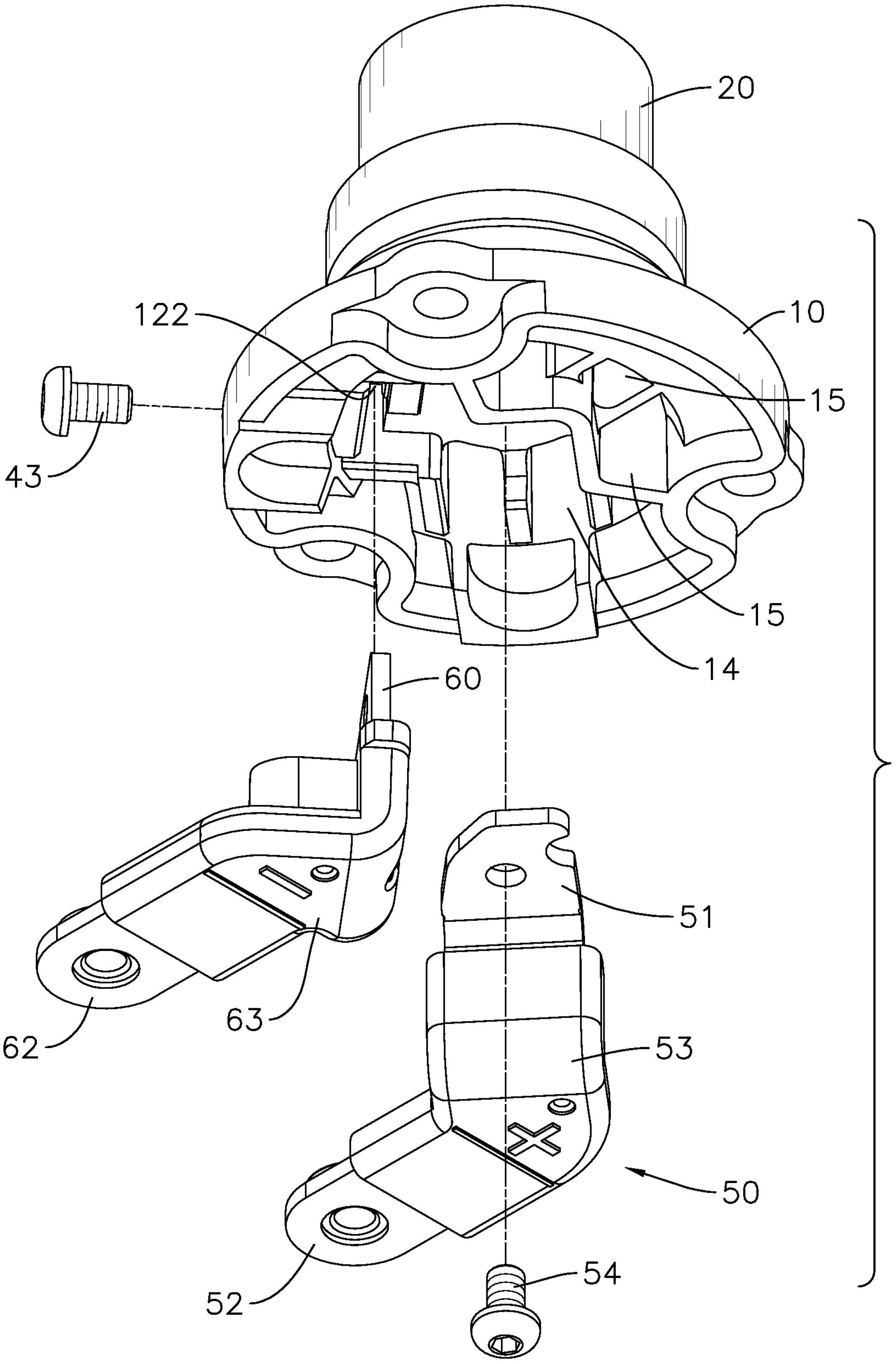
FIG. 4 is an exploded perspective view of the assembled electrical connector in FIG. 1 showing that a first conductive sheet and a second conductive sheet are exploded.
Figure 5:
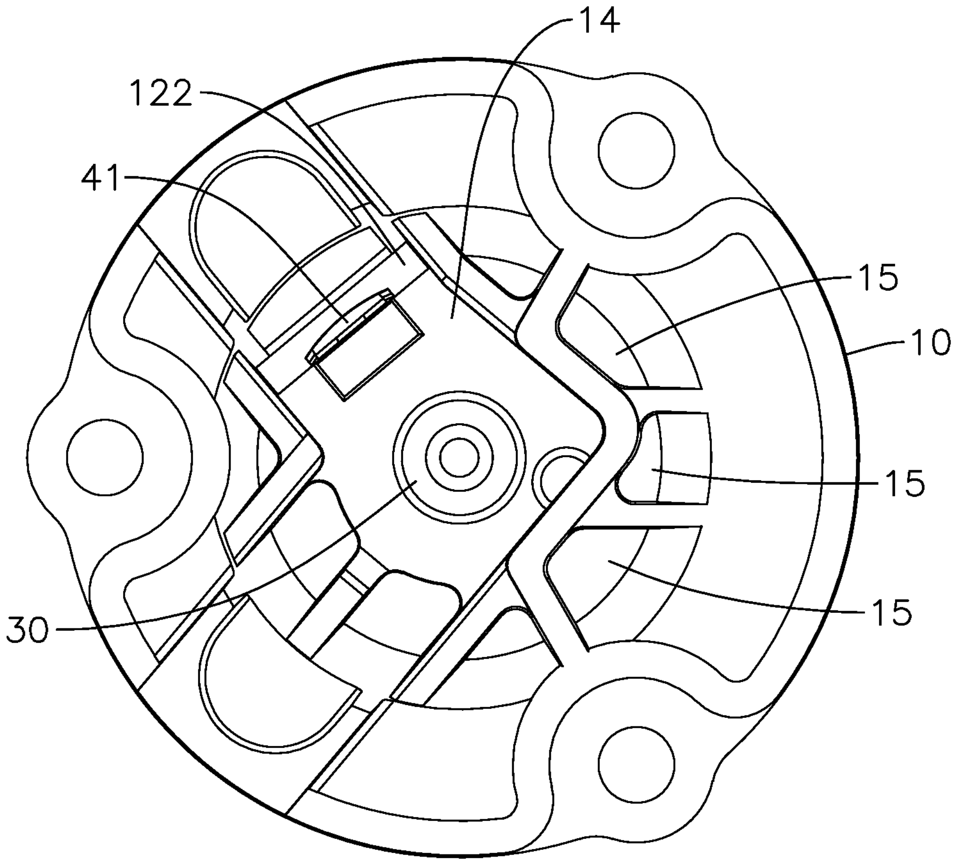
FIG. 5 is a bottom plan view of the assembled electrical connector in FIG. 1.
Figure 6:
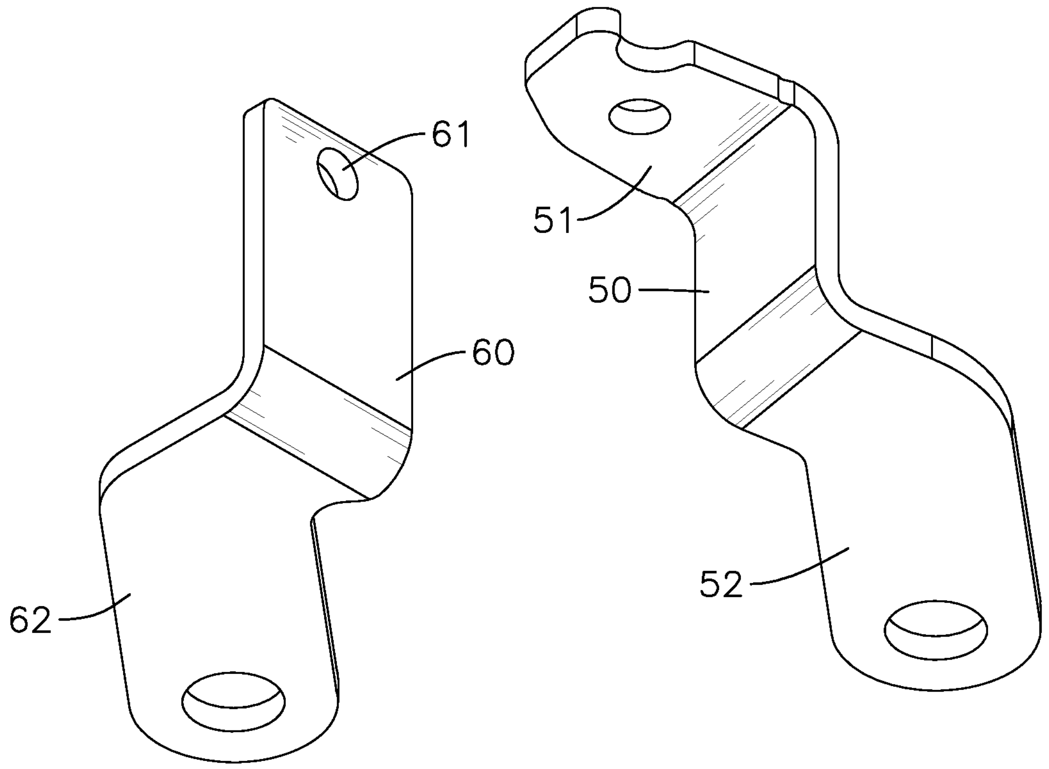
FIG. 6 is a perspective view of the first and the second conductive sheets of the assembled electrical connector in FIG. 4.

The terminal stage 12 has a height and a bottom end extending downwardly into the step 11. A bottom end of the first conductive terminal 30 in the center of the terminal stage 12 extends out of the bottom of the terminal stage 12. With reference to FIGS. 4 and 5, a cavity 14 is formed in a bottom of the base 10 and is located below the bottom of the terminal stage 12 and communicates with the through passage 122 in the terminal stage 12. The cavity 14 is adapted to install the first conductive sheet 50 and the second conductive sheet 60. With reference to FIG. 6, the first conductive sheet 50 has a vertical segment, an upper horizontal segment 51, and a lower horizontal segment 52. The upper horizontal segment 51 and the lower horizontal segment 52 respectively horizontally extend from an upper end and a lower end of the vertical segment of the first conductive sheet 50. The upper horizontal segment 51 is located in the cavity 14 and is connected to a bottom end of the first conductive terminal 30 by a bolt 54 threaded into the bottom end of the first conductive terminal 30 with electrical connection.

The second conductive sheet 60 has a vertical segment, a horizontal segment 62 horizontally extending from a bottom end of the vertical segment, and a fixing hole 61 formed in the vertical segment near a top end thereof. The second conductive sheet 60 is inserted into the cavity 14 via the vertical segment thereof. The fixing hole 61 is aligned with the positioning hole 111 radially formed in the step 11 and the connecting hole 42 in the conductive portion 41 of the second conductive terminal 40.

Figure 7:
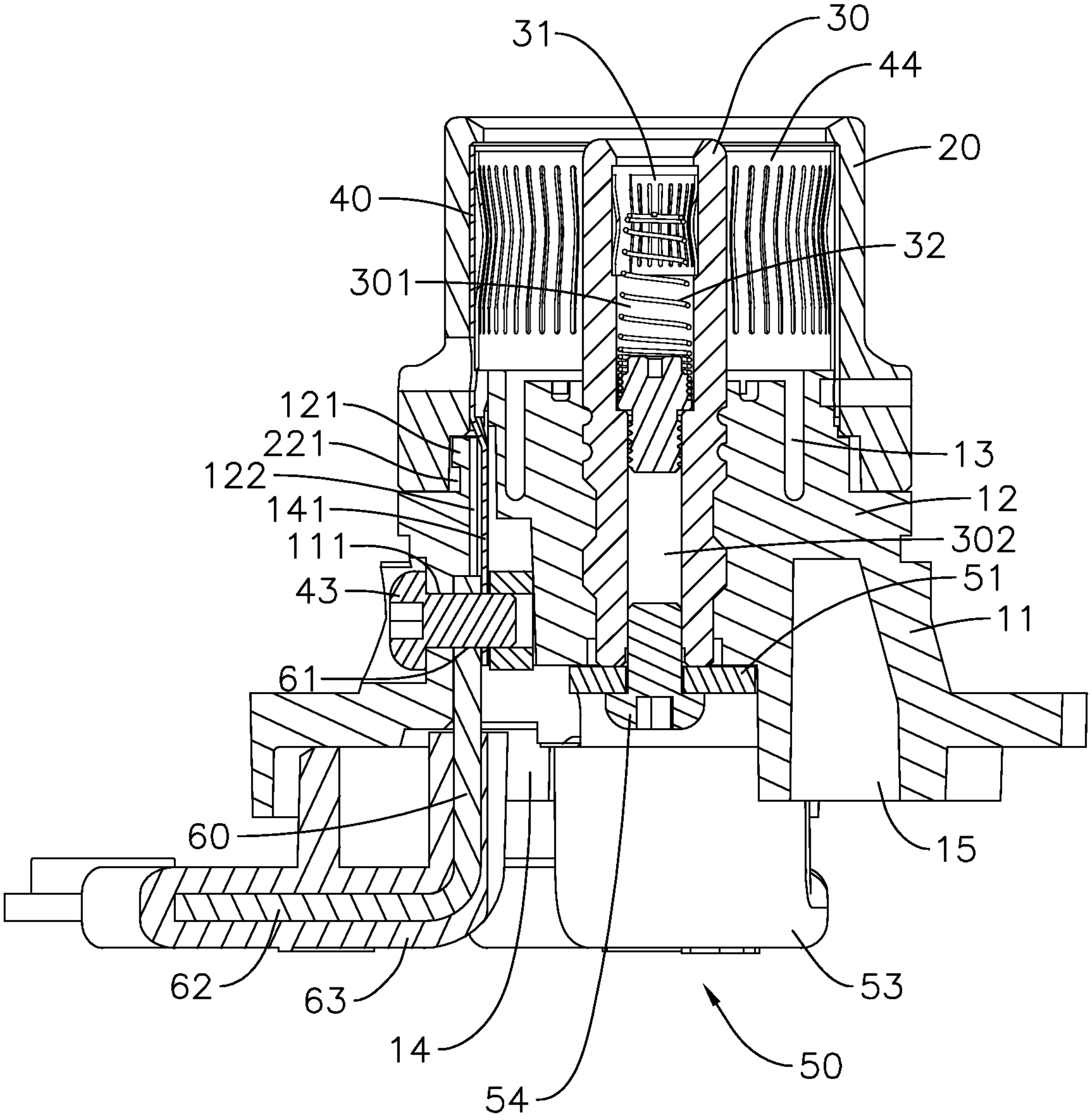
FIG. 7 is a cross sectional side view of the assembled electrical connector in FIG. 1.

With reference to FIG. 7, the bolt 43 is inserted through the positioning hole 111 in the step 11 and is connected with the vertical segment of the second conductive sheet 60 and the conductive portion 41 of the second conductive terminal 40 via threaded connection to form electrical connection therebetween. Because the second conductive sheet 60 is inserted into the cavity 14 via the vertical segment thereof, an area of the cavity 14 can be decreased. At least one weight-reducing recess 15 can be formed in the bottom of the base 10 and located at an outer side with respect to the cavity 14. Accordingly, material usage for molding the base 10 can be decreased.

Figure 8:
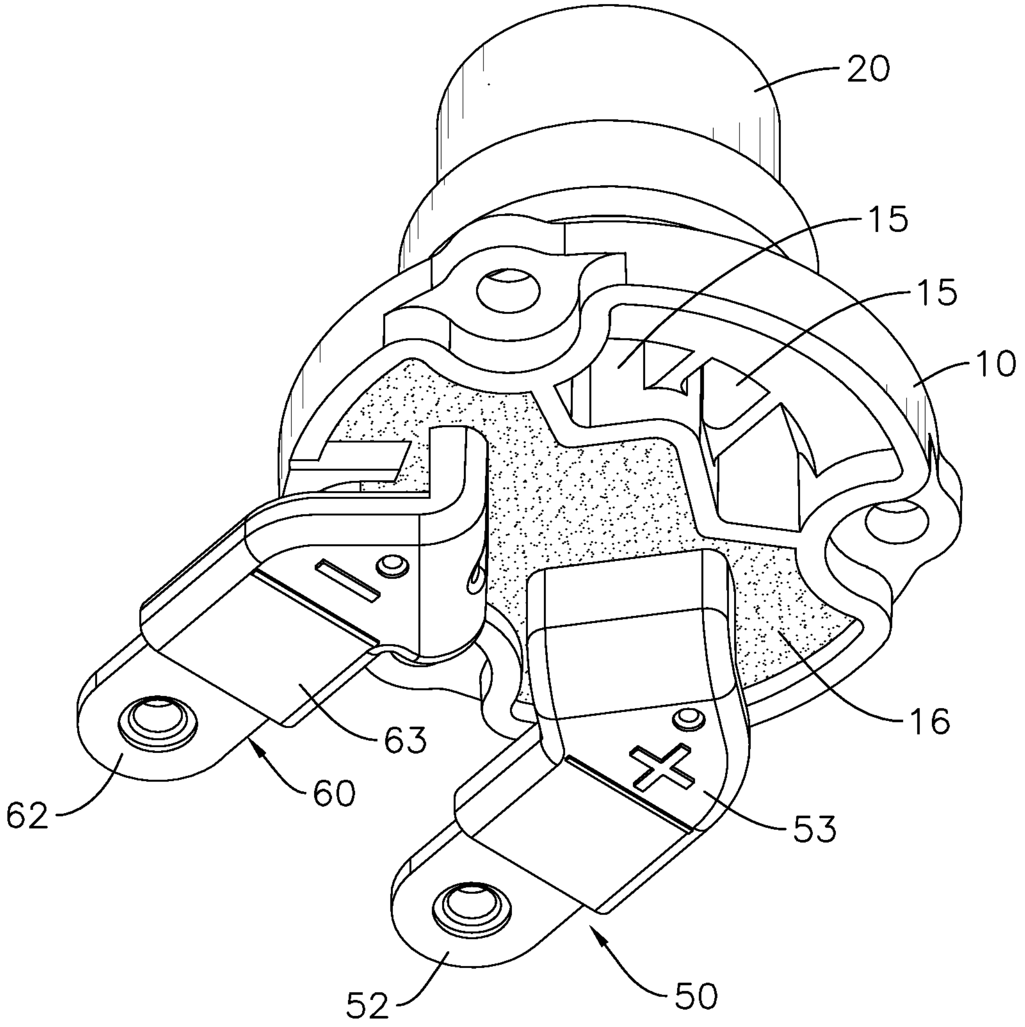
FIG. 8 is a bottom perspective view of the assembled electrical connector in FIG. 1.
Figure 9:
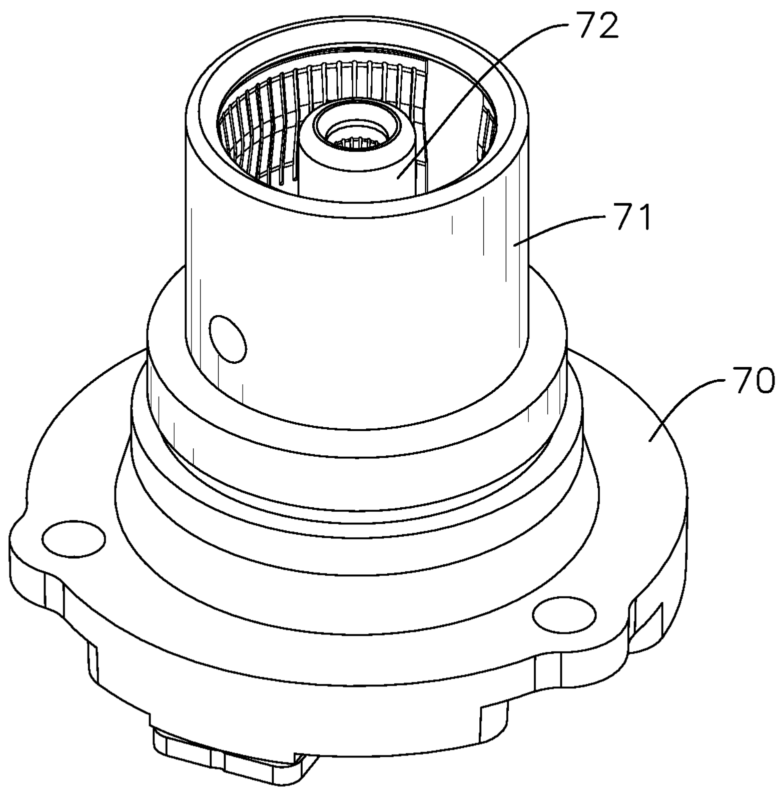
FIG.9 PRIOR ART
FIG. 9 is a perspective view of an electrical connector in accordance with a prior art.
Figure 10:
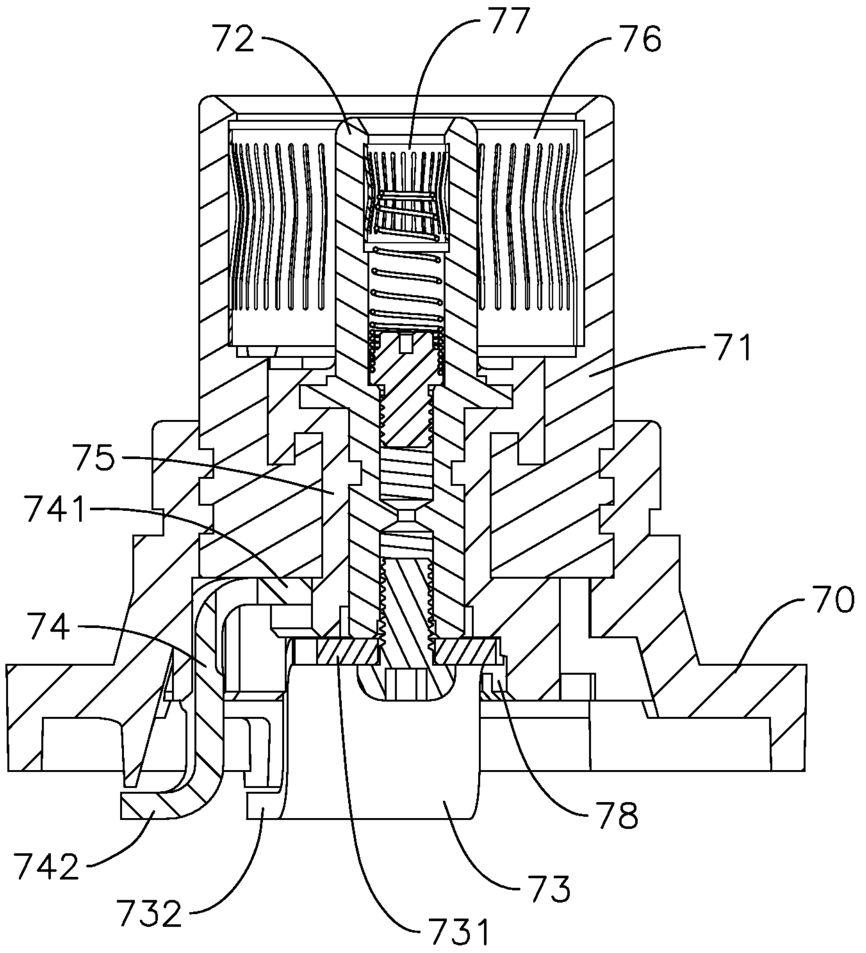
FIG.10 PRIOR ART
FIG. 10 is a cross sectional side view of the electrical connector in FIG. 9.
Figure 11:
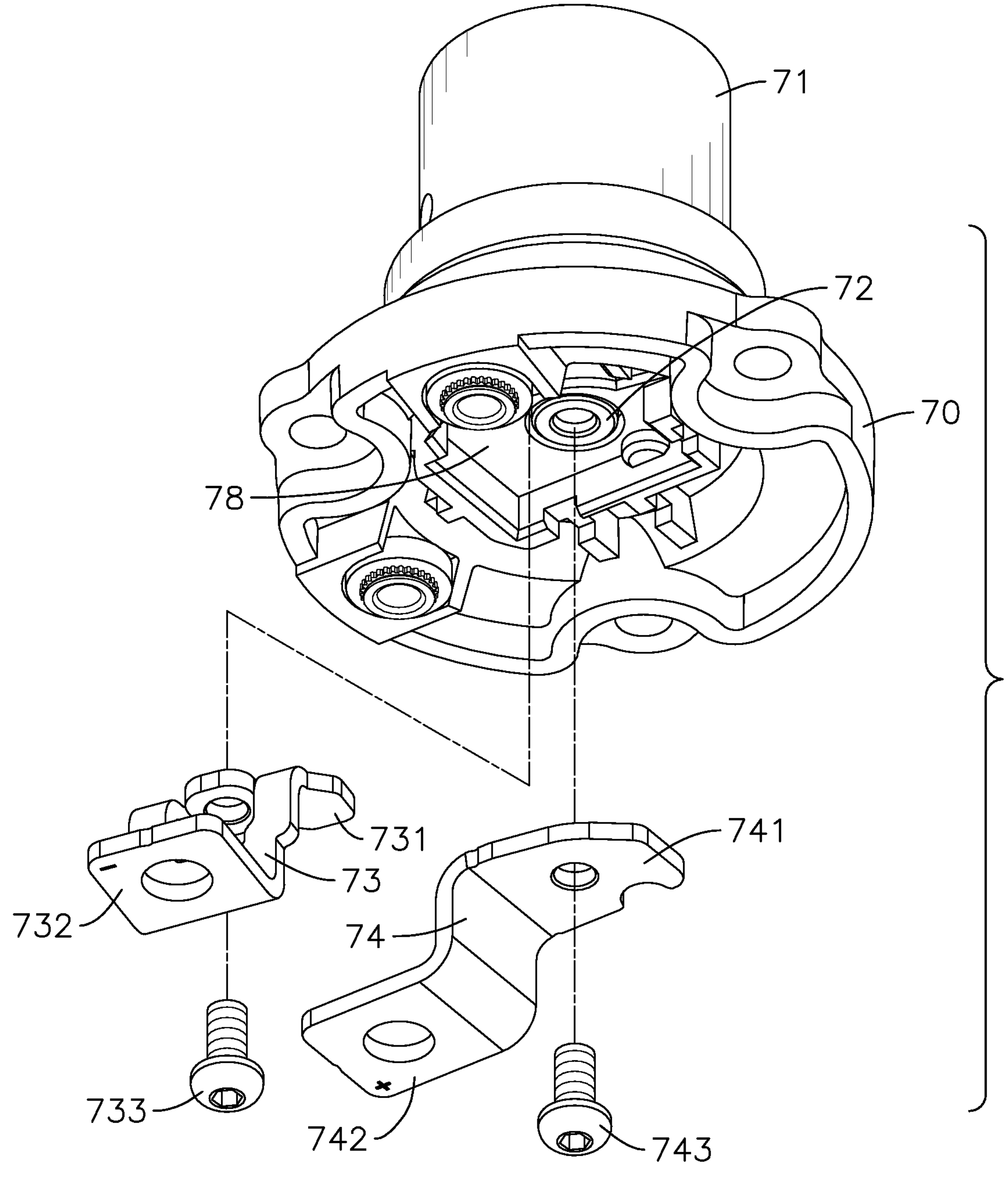
FIG.11 PRIOR ART
FIG. 11 is an exploded perspective view of the electrical connector in FIG. 9.
Figure 12:
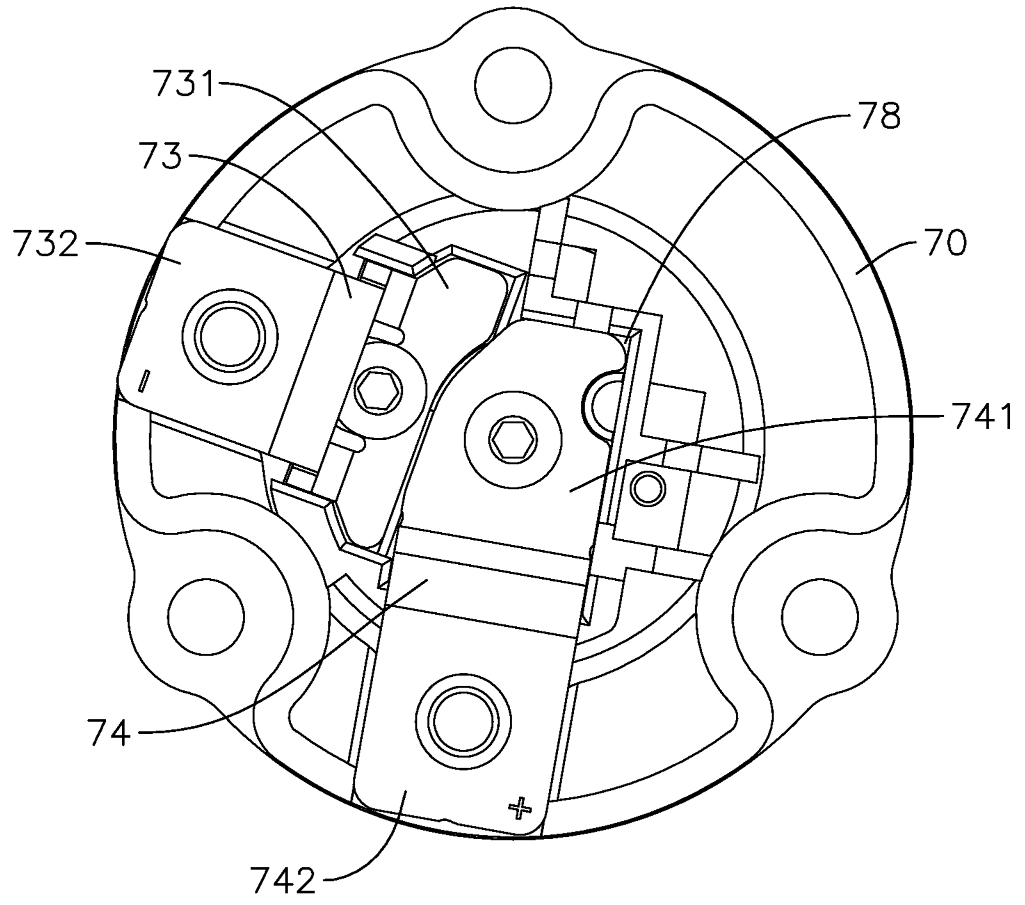
FIG.12 PRIOR ART
FIG. 12 is a bottom plan view of the electrical connector in FIG. 9.
Figure 13:
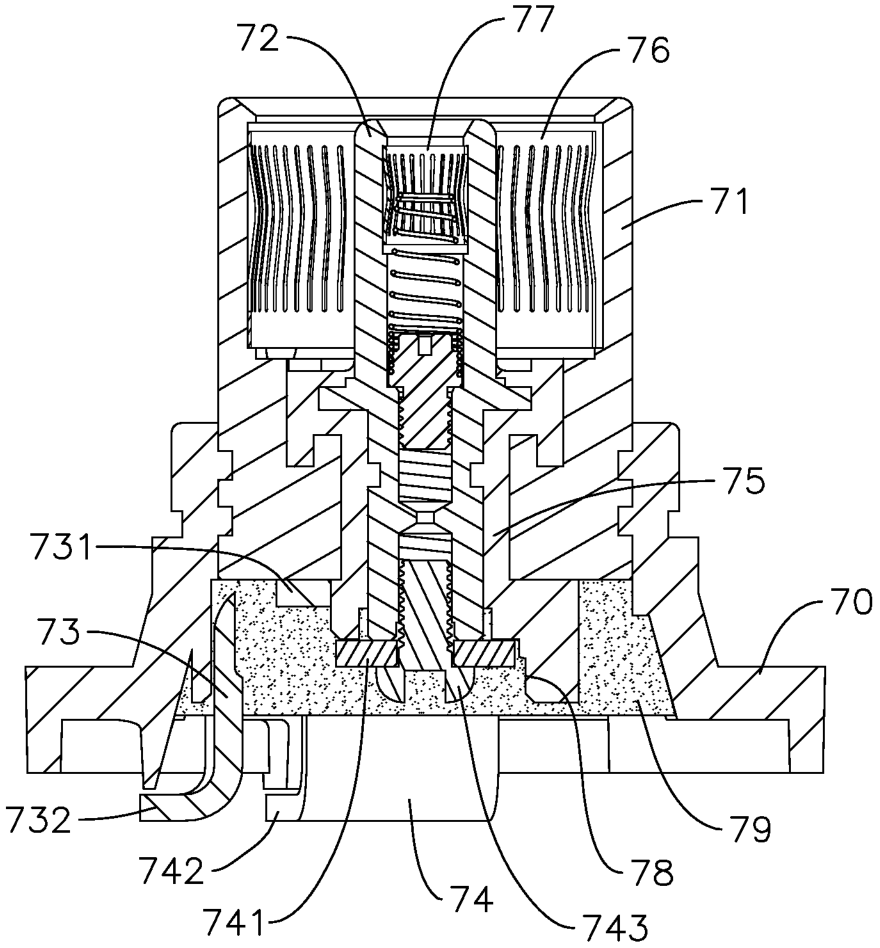
FIG.13 PRIOR ART
FIG. 13 is another cross sectional side view of the electrical connector in FIG. 9.

With reference to FIG. 8, after the first conductive sheet 50 and the second conductive sheet 60 are assembled, a sealing glue 16 is filled in the bottom of the base 10 to fill up the cavity 14. Since the first conductive sheet 50 and the second conductive sheet 60 are arranged at the bottom of the base 10 at an angle, it needs to be considered whether a creepage distance from the first conductive sheet 50 to the second conductive sheet 60 along a surface of the sealing glue 16 meets the safety requirement. To ensure there is enough creepage distance between the first conductive sheet 50 and the second conductive sheet 60, portions of the first conductive sheet 50 and the second conductive sheet 60 extending out from the sealing glue 16 are covered by respective insulation layers 53, 63, except that an end of the lower horizontal segment 52 of the first conductive sheet 50 and an end of the horizontal segment 62 of the second conductive sheet 60 are uncovered for electrical connections. The arrangements of the insulation layers 53, 63 can greatly increase an insulation surface between the first conductive sheet 50 and the second conductive sheet 60 to meet the creepage distance required by the safety specification.

With reference to FIG. 7, a first crown spring 31 is disposed in the first conductive terminal 30 and a second crown spring 44 is disposed in the second conductive terminal 40. The first conductive terminal 30 is tubular and has an upper cavity 301 and a lower cavity 302 formed therein and communicating with each other. The first crown spring 31 and a contact spring 32 are disposed in the upper cavity 301. The first crown spring 31 is located above the contact spring 32 and inside an opening of the first conductive terminal 30. The second crown spring 44 abuts against an inner surface of the second conductive terminal 40 with electrical connection. When the assembled electrical connector of the present invention is connected to a corresponding connector, the first conductive terminal 30 and the second conductive terminal 40 are respectively electrically connected to the corresponding connector via the first crown spring 31 and the second crown spring 44.

With such arrangements, the second conductive terminal 40 is externally assembled on the terminal stage 12 of the base 10 and is not combined with the base 10 via insert molding. The second conductive terminal does not need to use a machining product, thereby saving material and decreasing costs. Moreover, the base 10 is connected with the upper cap 20 via the upper portion (the terminal stage 12) thereof, and the first conductive terminal 30 and the second conductive terminal 40 are coaxially arranged via the upper cap 20 to enhance assembly and production conveniences. In addition, the second conductive terminal 40 is a ring sheet, and the second conductive sheet 60 is inserted into the cavity 14 via the vertical segment thereof and is connected to the second conductive terminal 40 with electrical connection. Therefore, the area of the cavity 14 can be decreased, thereby increasing area for the weight-reducing recess 15 to further decrease the material usage for molding the base 10.

What is claimed is:

1. An assembled electrical coaxial connector, comprising:

a base having a terminal stage formed on a top of the base;

a first conductive terminal mounted in a center of the terminal stage and having an upper segment extending out of the terminal stage and a lower segment mounted in the terminal stage;

a second conductive terminal being a ring sheet and externally assembled around the terminal stage of the base and coaxially arranged with and electrically isolated from the first conductive terminal via the terminal stage; and an upper cap being tubular and mounted on the top of the base;

wherein the upper segment of the first conductive terminal is located in a center of the upper cap; and the second conductive terminal abuts against an internal surface of the upper cap;

wherein the terminal stage is cylindrical and has at least two protruding ribs radially formed on and arranged around the terminal stage at equiangular intervals;

the upper cap is tubular and has a circular insertion opening and an assembly opening respectively formed in two ends of the upper cap;

the assembly opening has an internal diameter corresponding to an external diameter of the terminal stage in size;

at least two engaging blocks are radially formed on and arranged around an inner edge of the assembly opening of the upper cap and correspond to the at least two protruding ribs radially formed on the terminal stage in quantity and location.

2. The assembled electrical coaxial connector as claimed in claim 1, wherein each of the engaging blocks radially formed on the assembly opening of the upper cap has a stopping portion formed on an end of the engaging block such that the engaging block is L-shaped.

3. The assembled electrical coaxial connector as claimed in claim 1, wherein at least one annular groove is formed in a top surface of the terminal stage, and a depth of each of the at least one annular groove is larger than half of a radius of the terminal stage.

4. An assembled electrical coaxial connector, comprising:

a base having a terminal stage formed on a top of the base;

a first conductive terminal mounted in a center of the terminal stage and having an upper segment extending out of the terminal stage and a lower segment mounted in the terminal stage;

a second conductive terminal being a ring sheet and externally assembled around the terminal stage of the base and coaxially arranged with and electrically isolated from the first conductive terminal via the terminal stage; and an upper cap being tubular and mounted on the top of the base;

wherein the upper segment of the first conductive terminal is located in a center of the upper cap; and the second conductive terminal abuts against an internal surface of the upper cap; wherein a through passage is formed in the terminal stage and is vertically formed through a bottom of the base; and the second conductive terminal has a conductive portion being an elongated piece, extending downwardly from a bottom of the second conductive terminal, and inserted into the through passage in the terminal stage.

5. The assembled electrical coaxial connector as claimed in claim 4, wherein the base has a base body, a step protruding upwardly from a middle of the base, and a positioning hole radially formed in the step;

the terminal stage protrudes upwardly from a top of the step; and the second conductive terminal has a connecting hole formed in the conductive portion near a bottom of the conductive portion and aligned with the positioning hole in the step.

6. The assembled electrical coaxial connector as claimed in claim 5, wherein a cavity is formed in the bottom of the base, is located below the terminal stage, and communicates with the through passage;

a first conductive sheet has a vertical segment, an upper horizontal segment, and a lower horizontal segment, wherein the upper horizontal segment and the lower horizontal segment respectively and horizontally extend from an upper end and a lower end of the vertical segment of the first conductive sheet;

the upper horizontal segment of the first conductive sheet is located in the cavity of the base and is connected to a bottom end of the first conductive terminal with electrical connection;

a second conductive sheet has a vertical segment, a horizontal segment horizontally extending from a bottom end of the vertical segment of the second conductive sheet, and a fixing hole formed in the vertical segment of the second conductive sheet near a top end of the vertical segment of the second conductive sheet;

the second conductive sheet is inserted in the cavity via the vertical segment of the second conductive sheet;

the fixing hole in the vertical segment of the second conductive sheet is aligned with the positioning hole in the step and the connecting hole in the conductive portion of the second conductive terminal; and a bolt is inserted through the positioning hole and is connected with the vertical segment of the second conductive sheet and the conductive portion of the second conductive terminal via threaded connections.

7. The assembled electrical coaxial connector as claimed in claim 6, wherein a sealing glue is filled in the bottom of the base to fill up the cavity of the base; and portions of the first conductive sheet and the second conductive sheet extending out from the sealing glue are covered by respective insulation layers, except that an end of the lower horizontal segment of the first conductive sheet and an end of the horizontal segment of the second conductive sheet are uncovered.

8. The assembled electrical coaxial connector as claimed in claim 6, wherein at least one weight-reducing recess is formed in the bottom of the base and is located at an outer side with respect to the cavity.

9. The assembled electrical coaxial connector as claimed in claim 4, wherein at least one annular groove is formed in a top surface of the terminal stage, and a depth of each of the at least one annular groove is larger than half of a radius of the terminal stage.

10. An assembled electrical coaxial connector comprising:

a base having a terminal stage formed on a top of the base;

a first conductive terminal mounted in a center of the terminal stage and having an upper segment extending out of the terminal stage and a lower segment mounted in the terminal stage;

a second conductive terminal being a ring sheet and externally assembled around the terminal stage of the base and coaxially arranged with and electrically isolated from the first conductive terminal via the terminal stage; and an upper cap being tubular and mounted on the top of the base;

wherein the upper segment of the first conductive terminal is located in a center of the upper cap; and the second conductive terminal abuts against an internal surface of the upper cap; wherein a first crown spring is disposed in the first conductive terminal;

a second crown spring is disposed in the second conductive terminal;

the first conductive terminal is tubular and has an upper cavity and a lower cavity formed in the first conductive terminal and communicating with each other;

the first crown spring and a contact spring are disposed in the upper cavity of the first conductive terminal;

the first crown spring is located above the contact spring and inside an opening of the first conductive terminal; and the second crown spring abuts against an inner surface of the second conductive terminal with electrical connection.

11. The assembled electrical coaxial connector as claimed in claim 10, wherein at least one annular groove is formed in a top surface of the terminal stage, and a depth of each of the at least one annular groove is larger than half of a radius of the terminal stage.

* * * * *